United States Patent [19]

Mayo, Jr. et al.

[11] Patent Number: 5,440,175

[45] Date of Patent: Aug. 8, 1995

[54] WATERWHEEL-DRIVEN GENERATING UNIT

[76] Inventors: Howard A. Mayo, Jr., 2051 Log Cabin Rd., York, Pa. 17404; Kenneth R. Broome, 15 Fawn Dr., Reading, Pa. 19607

[21] Appl. No.: 254,063

[22] Filed: Jun. 3, 1994

Related U.S. Application Data

[63] Continuation-in-part of Ser. No. 86,315, Jul. 6, 1993, abandoned.

[51] Int. Cl.$^6$ .......................... F03B 13/00; F03B 7/00
[52] U.S. Cl. ........................................ 290/54; 290/53; 415/3.1; 415/202; 415/906; 416/197 A
[58] Field of Search ...................... 290/53, 54; 415/3.1, 415/202, 906; 416/197 A

[56] References Cited

U.S. PATENT DOCUMENTS

| | | | |
|---|---|---|---|
| 833,361 | 10/1906 | Wilmore | 290/53 |
| 1,061,399 | 5/1913 | Osborne | 415/140 |
| 1,529,824 | 3/1925 | Adelmann | 415/906 |
| 2,097,286 | 10/1937 | McGee | 290/54 |
| 4,053,787 | 10/1977 | Diggs | 290/54 |
| 4,137,005 | 1/1979 | Comstock | 290/53 |
| 4,224,793 | 9/1980 | Gutsfeld | 415/6 |
| 4,296,602 | 10/1981 | Hales et al. | 415/906 |
| 4,843,249 | 6/1989 | Bussiere | 290/53 |
| 5,082,423 | 1/1992 | Morgan | 415/141 |

FOREIGN PATENT DOCUMENTS

| | | | |
|---|---|---|---|
| 62968 | 4/1982 | Japan | 415/3.1 |
| 2190144 | 11/1987 | United Kingdom | 415/202 |

Primary Examiner—Steven L. Stephan
Assistant Examiner—Robert Lloyd Hoover
Attorney, Agent, or Firm—Aquilino & Welsh

[57] ABSTRACT

An electric generator assembly driven by a waterwheel wherein the axial length of the waterwheel is substantially greater than the diameter thereof and contains a speed-increasing device for driving a high speed generator. The assembly is supported from a bridge spanning the full axial length of the waterwheel and the width of the stream and said bridge also supports an adjustable chute extending from the dam crest to the waterwheel. The waterwheel has longitudinal buckets designed to develop maximum energy over a wide range of flow of water and also discharge debris. The buckets are vented as necessary to improve filling and discharge and also minimize vibration. The complete bridge assembly is supported adjacent opposite ends by hydraulic cylinder units connected to and adapted to raise the unitary bridge, chute and waterwheel assembly above increased tailwater levels to reduce drag and rotating friction. By providing either a synchronous or induction generator with a rotating rotor and non-rotatable stator of conventional commercial design, electric power leads are brought out through a non-rotating hollow shaft to a local disconnect switch and transformer that is adapted to increase the voltage, as necessary, for transmission. Retention of water in the buckets until each one reaches the lowest point of travel is provided by an adjustable shroud.

9 Claims, 6 Drawing Sheets

WATERWHEEL-DRIVEN GENERATING UNIT

RELATED APPLICATION

The present application is a Continuation-in-Part of Serial Number 08/086,315, filed Jul. 6, 1993 for WATERWHEEL DRIVEN GENERATING UNIT.

BACKGROUND OF THE INVENTION

This invention pertains, in general, to overshot-type waterwheels and more particularly, to a waterwheel with an axial length substantially greater than the diameter and containing a speed-increaser gear unit and electric generator internally contained within the waterwheel. This assembly is supported by a platform spanning the full length of the waterwheel, which also supports an adjustable chute extending from the dam crest to the waterwheel for the length thereof. The above-described assembly is adjustable vertically by hydraulic cylinder units which raise the waterwheel above the tailwater elevations to prevent the tailwater from causing added rotating friction. Such waterwheel installations are applicable typically at low head sites. Should the dam and spillway length be too long for a single unit, multiple units may be installed.

At present and in the recent past, hydroelectric installations using low-head dam sites, such as those typically less than 15 feet when measured vertically from headwater to tailwater, have generally been unable to economically develop commercial power. The limited number of installations of this type which have been developed either had a subsidy, special power rates, very unusual site conditions, or proved to be economic failures. The hydraulic turbines currently being manufactured are usually custom-designed and are very expensive per unit of power output due to their complex designs which require such items as trash racks, flume or penstock, intake gate, speed-increaser and generator, powerhouse, tailrace and possibly other auxiliary equipment. Existing dams are typically most economical to develop but they also require either an opening through or around the dam or a syphon intake. Each of these items adds substantially to the cost.

To illustrate the present state of the art to which the present invention pertains, the following patents are cited as representative of the current state of the art on the subject of the present invention and over which this invention comprises an advance in the art of power generation:

U.S. Pat. No. 1,061,399 Osborne 1913
U.S. Pat. No. 1,529,824 Adelmann 1925
U.S. Pat. No. 4,053,787 Diggs 1977
U.S. Pat. No. 4,224,793 Gutsfeld 1980
U.S. Pat. No. 4,296,602 Hales et al 1981
U.S. Pat. No. 5,082,423 Morgan 1992

SUMMARY OF THE INVENTION

To overcome the high costs of using a conventional hydraulic turbine, the use of a waterwheel is a much simpler and less expensive means of converting potential low-head hydraulic energy to useful torque output. Waterwheels, however, generally have a low rotational speed and therefore, a reliable high ratio speed-increasing means, such as a planetary gear system, is needed to economically increase the speed to that of an economical generator. To eliminate the need for a powerhouse and facilitate pre-assembly of components, the necessary gears and generator preferably are located within the waterwheel. To overcome the need for trash racks and their maintenance cost, an overshot waterwheel is used as this type of wheel does not generally clog as it can usually discharge most debris as it arrives.

Also, by providing an overshot waterwheel of substantial length compared to the diameter which is essentially equal to the desired head capabilities, the full stream or canal flow can be utilized without diversion of discharge, thereby significantly increasing the power output which can be supplied to a grid transmission system where the variable output can best be used. The waterwheel buckets may therefore be designed for maximum energy output under variable conditions rather than the historical best efficiency for a given flow or power output as has been typical heretofore, especially for mill applications. The waterwheel design proposed herein is also particularly suitable for fabrication by automated welding procedures.

It is also proposed by the present invention that an open chute extending only from the dam crest to the overshot waterwheel would have a length approximately ¾ of the diameter of the wheel and have a width as long as the length of the waterwheel so that it is much less costly to manufacture than a syphon intake, penstock or other conventional hydraulic turbine intakes. By adding a supporting platform provided with vertical adjustment, the waterwheel and chute position can be adjusted vertically to accommodate increases in tailwater elevation due to higher or lower flows. In addition, the support for the system can be located back from the embankment or retaining wall away from the channel, if desired, in order to avoid added vertical or horizontal loading. Foundations can be simplified and built in the dry rather than in the waterway. Access to both ends of the dam preferably is provided and means for adjusting the slope of the open chute can be provided to optimize the flow angle approach onto the waterwheel. The latter is an important consideration in obtaining maximum energy for the installation since kinetic energy may be recovered, as well as the potential energy.

Maximum energy under variable flow conditions is obtained by having buckets on the waterwheel deeper than normal buckets to make use of higher flows while maintaining an optimum number of buckets. The bucket periphery is curved from an angle parallel to the chute at its lowest slope to an angle passing through the center of rotation of the waterwheel with the outer curve radius equal to one-half the bucket depth to provide maximum volume between buckets and minimum entrance flow impact areas.

The bucket depth is limited by the maximum outside diameter of the waterwheel which is limited by the size of the desired head at a site.

More details of the nature and capabilities of the buckets are set forth hereinafter in the specification.

OBJECTS OF THE INVENTION

It is the general object of the invention to provide an overshot waterwheel and electric power generator installation which is more economical than conventional low-head hydraulic turbine installations. A more specific object of the invention is to provide an overshot water wheel consisting of a large diameter steel cylinder acting as a girder with a length significantly greater than the diameter and surrounded by buckets shaped to develop the maximum energy output.

An additional object of the invention is to provide within the steel cylinder a high-ratio epicyclic speed-increasing unit and electric generator from which electrical leads can be extended to a conventional transformer and switch gear on the bank of a waterway.

An additional object of the invention is to provide an adjustable chute which runs from the dam crest to the waterwheel such that the angle and depth of flow onto the waterwheel can be varied with changes in the rate of water discharge.

Another additional object of the invention is to support the waterwheel and chute by a platform that can be changed in elevation by adjustable supports located adjacent to each end of the waterwheel.

A more specific object of the invention is to incorporate a planetary gear unit and generator with rotating rotor to reduce cost and permit extending generator leads through a non-rotating shaft to a transformer and switch gear nearby.

An additional object of the invention is to provide a shroud around the lower front or downstream portion of the waterwheel to retain water from flowing out of each bucket prematurely. This shroud will also be supported from the platform and provided with a means to raise it to dislodge debris.

Still another object of the invention is to provide simple, economical vents at the convex corner of each bucket with the cylindrical tube of the waterwheel to allow the air to escape as water enters the buckets.

These and further objects of the invention will become more fully apparent as the following description is read in light of the attached drawings.

DESCRIPTION OF THE PREFERRED EMBODIMENTS

Figure 1:
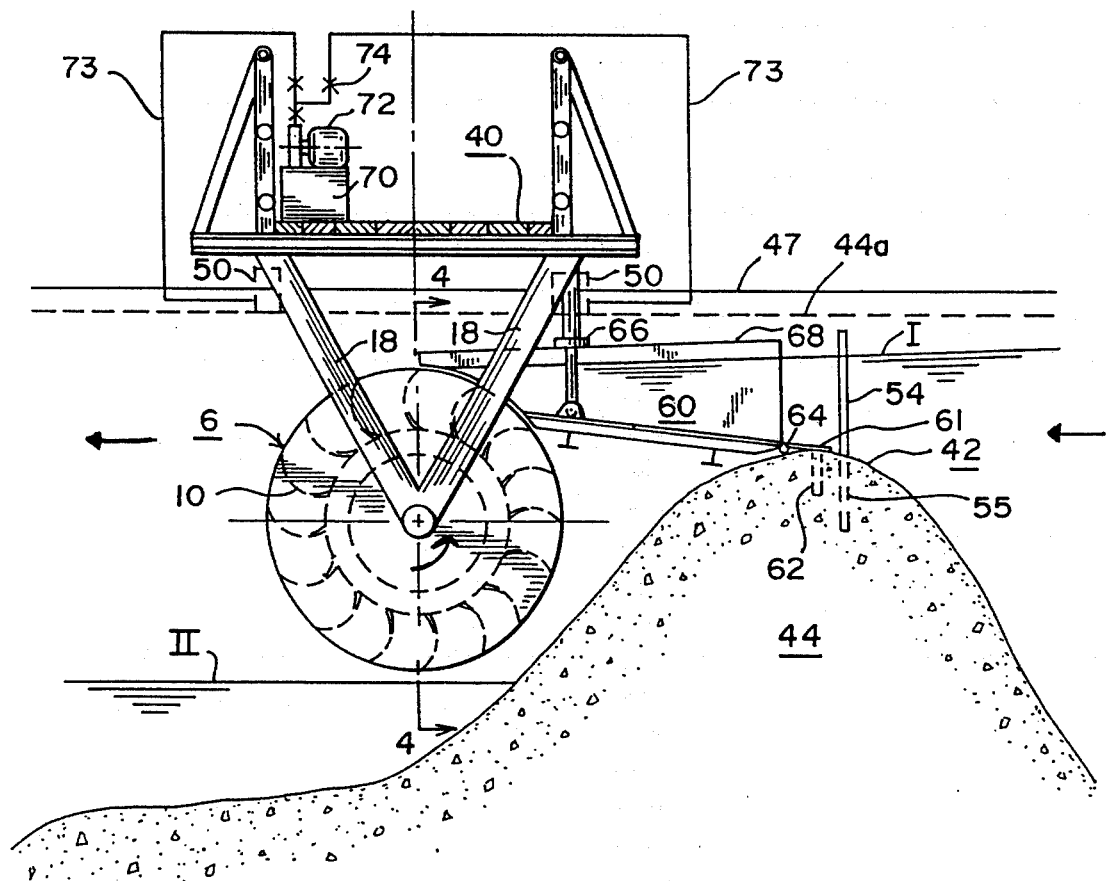
FIG. 1 is a vertical end view, taken on line 1—1 of FIG. 2, of a waterwheel generating unit constructed in accordance with this invention.
Figure 1A:
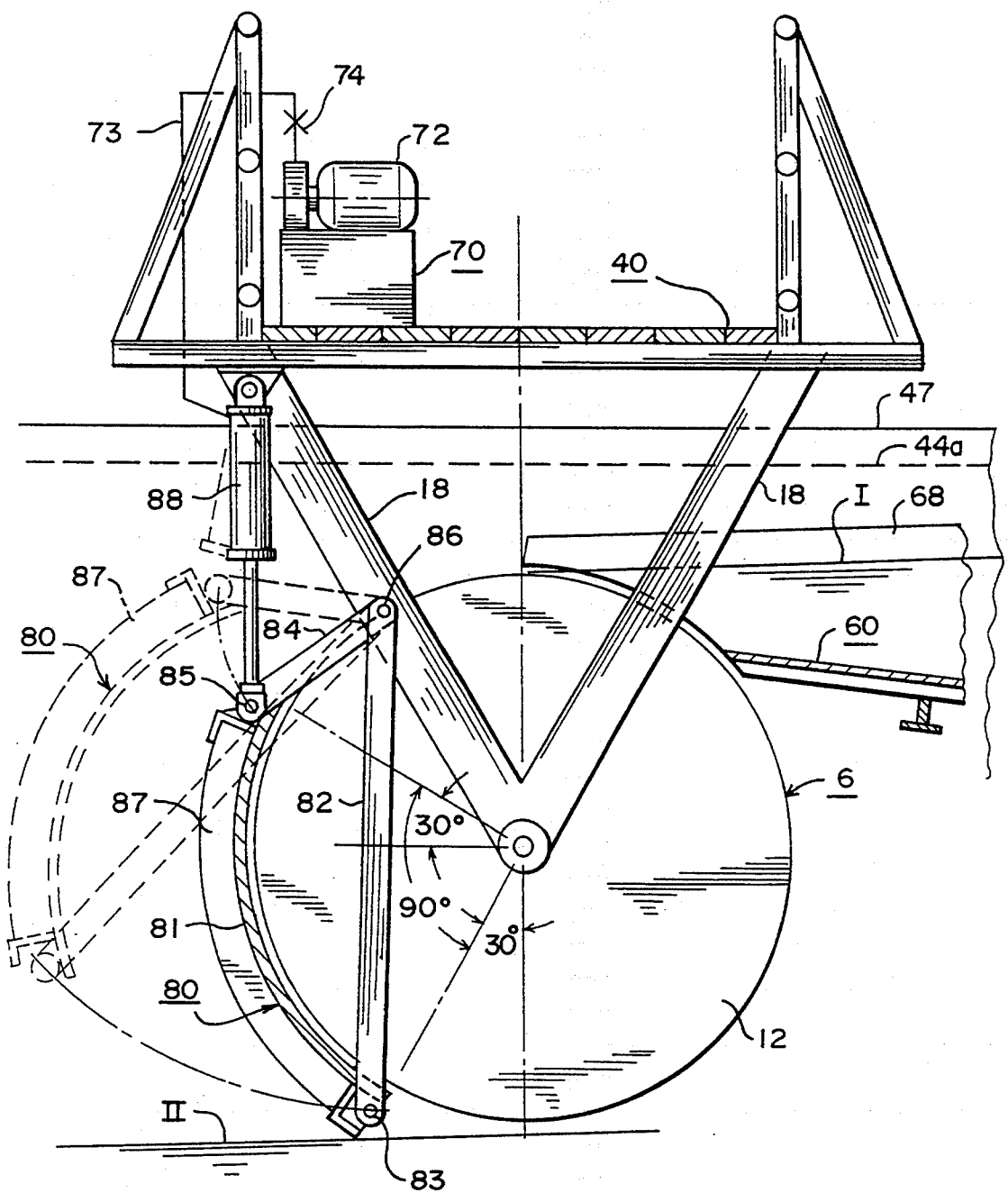
FIG. 1A is a view similar to FIG. 1 and includes an additional shroud adjacent the waterwheel.

Referring to the drawings, an overshot waterwheel 6 is operable between headwater I and tailwater II and comprises a metal cylinder generally designated 8 and surrounded by a multiple set of buckets 10, which are fixedly attached along one edge to cylinder 8 and are also attached and sealed at each end by flat circular plates or planar rings 12 and 13. The waterwheel 6 may be constructed in any structurally-rigid length with rigidly-attached intermediate rings and/or discs 14 to increase the rigidity of cylinder 8 and buckets 10.

Figure 2:
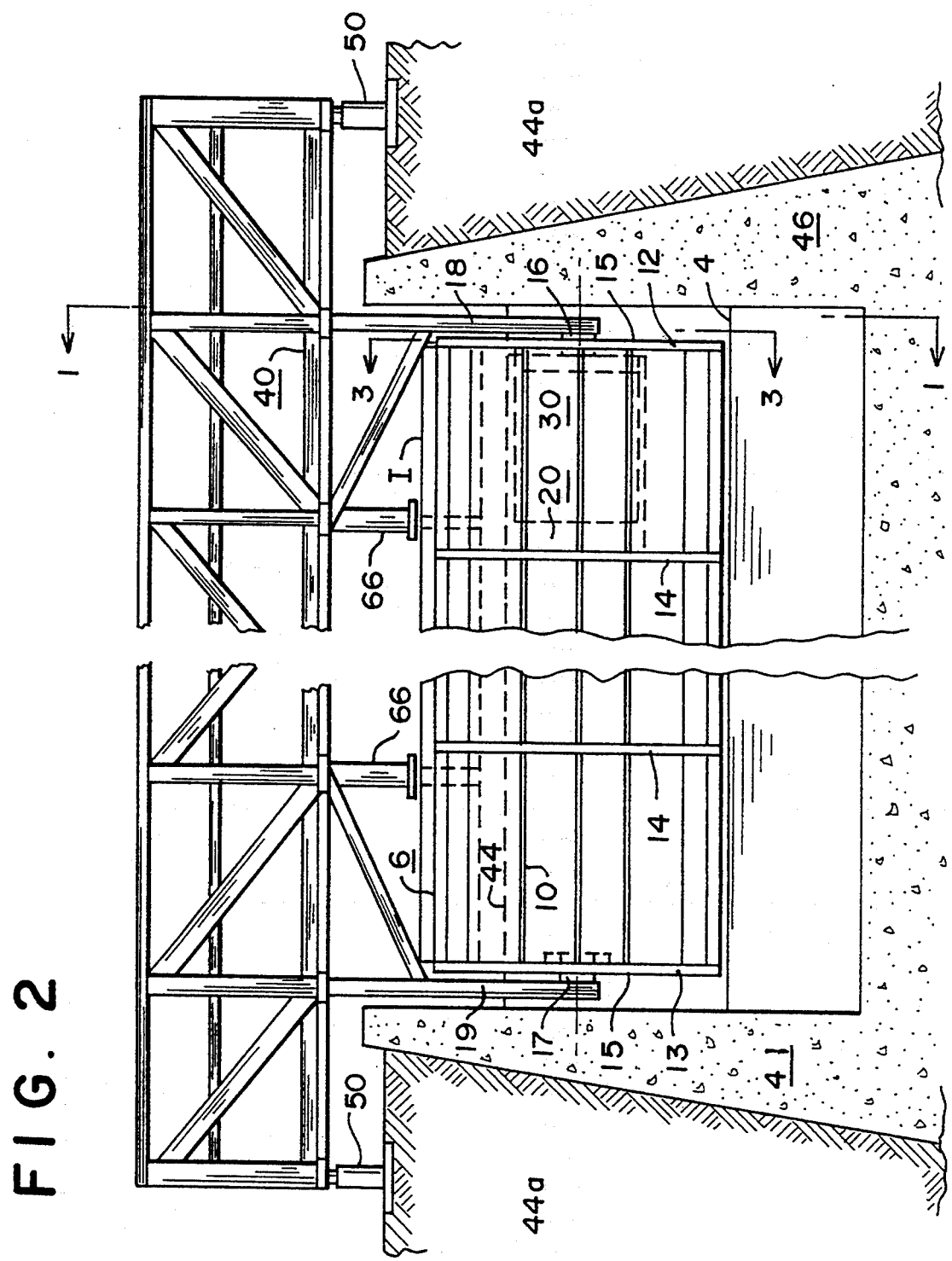
FIG. 2 is a foreshortened front view from downstream of a waterwheel generating unit constructed in accordance with the invention.

Internal reinforcing, not shown, may be added as necessary for additional stiffness. Trunnions 16 and 17, shown in FIG. 2, are centrally-located at each end of waterwheel 6 and are connected by bolts 25, see FIGS. 4 and 5, to support brackets 18 and 19, respectively, which depend from platform 40. Split end cover plates 15 include bearings 16a and 17a for trunnions 16 and 17 respectively. Plates 15 are attached to annular end plates 12 and 13 by bolts 29. These removable plates 15 facilitate internal access while preventing the entrance of water and debris. Within cylinder 8 there is a speed-increaser system, generally designated 20, directly connected by suitable means to electric generator 30.

Figure 3:
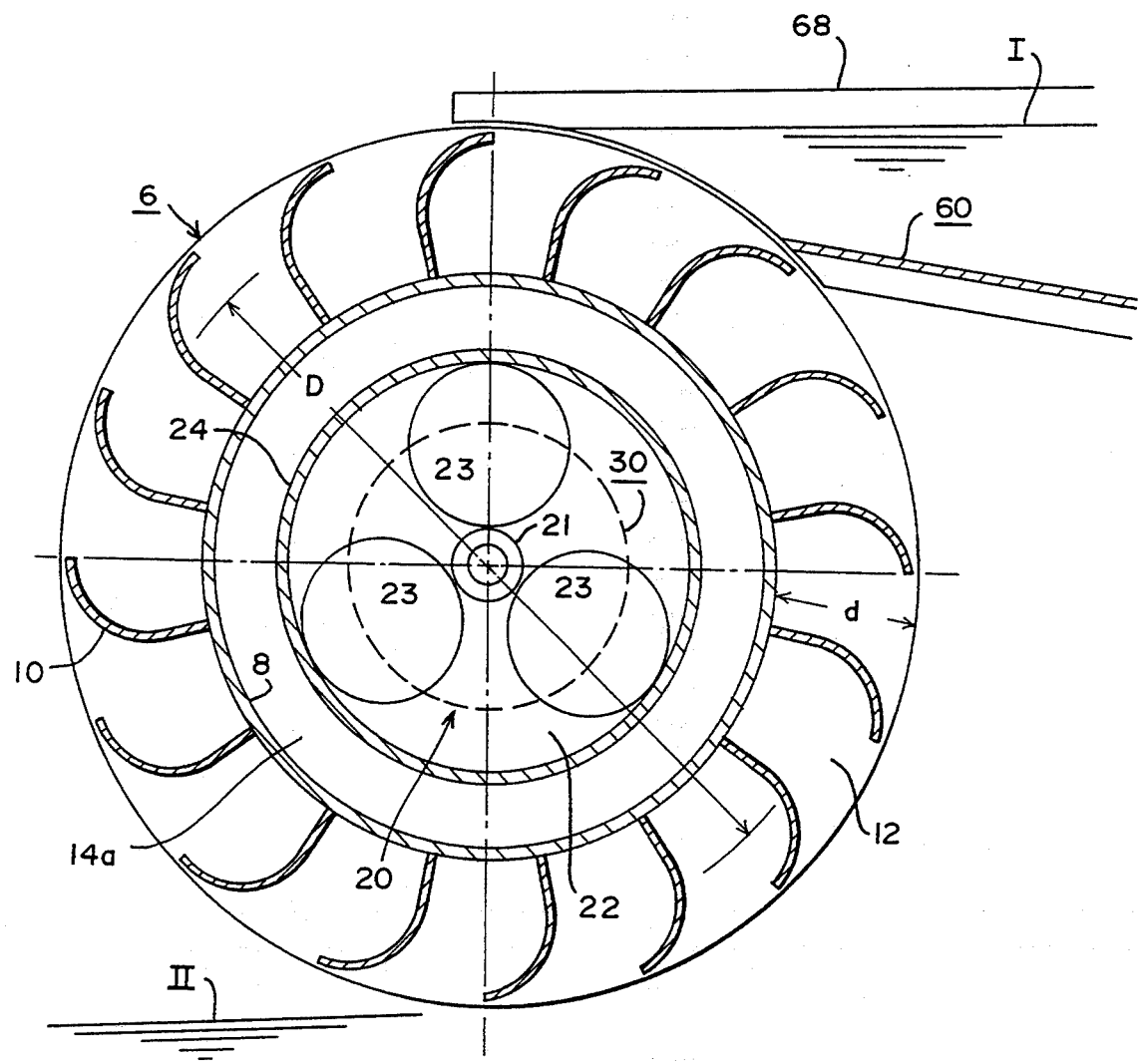
FIG. 3 is an enlarged partially-sectioned end view, taken on line 3—3 of FIG. 2, and shows a waterwheel containing a speed-increaser and showing a chute, waterwheel buckets and a planetary gear arrangement, generally taken on line 4—4 of FIG. 1.
Figure 4:
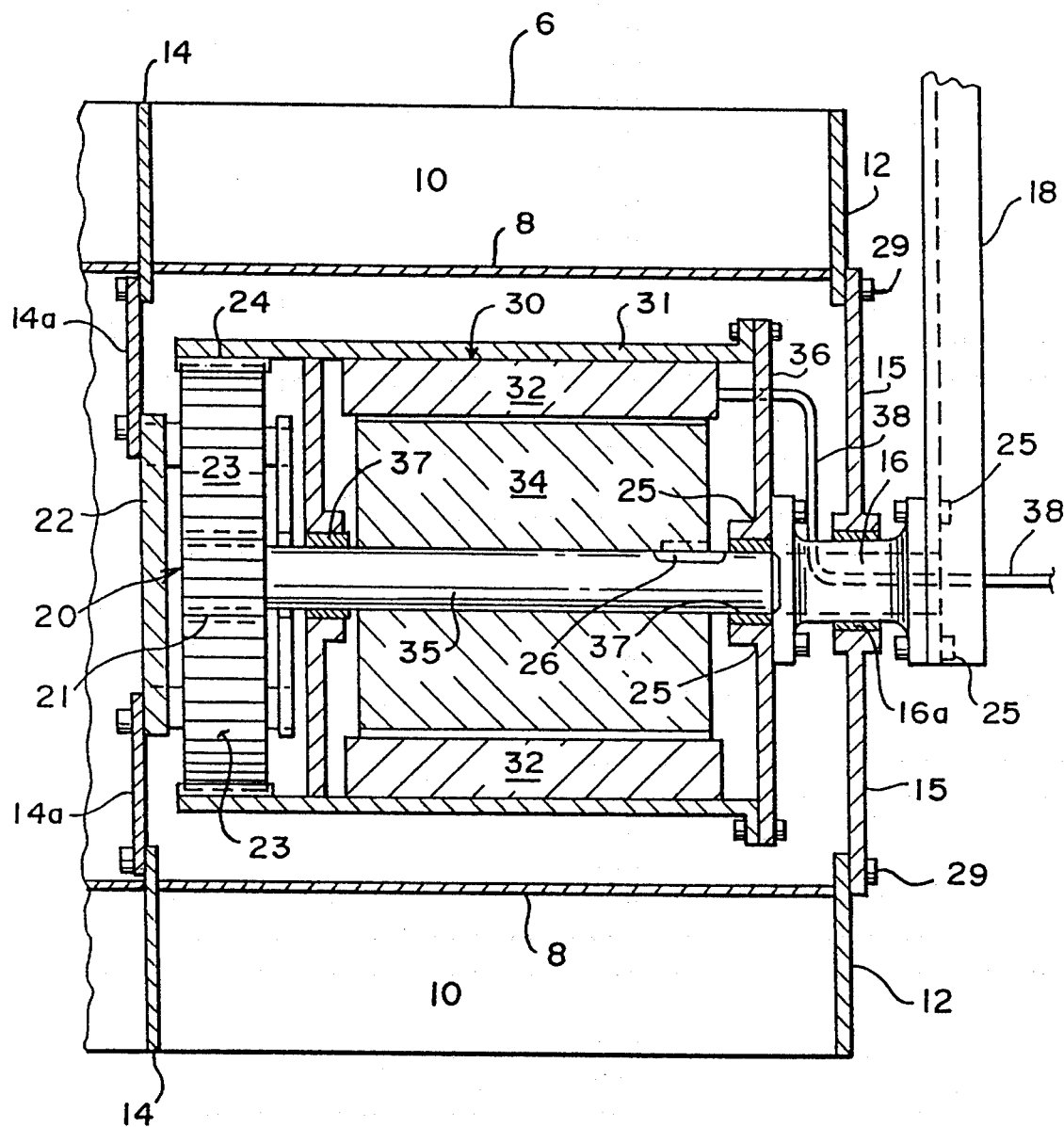
FIG. 4 is an enlarged partial sectional view generally on line 4—4 of FIG. 1 and showing the relationship of a speed-increaser and generator in the waterwheel.
Figure 5:
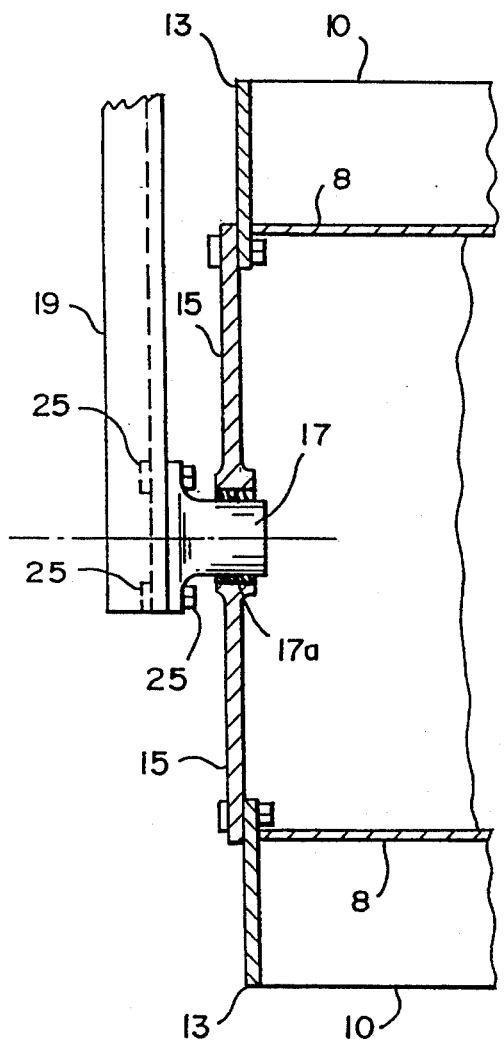
FIG. 5 is an enlarged fragmentary sectional view showing one of the opposite bearing arrangements for the waterwheel.
Figure 7:
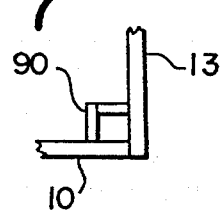
FIG. 7 is an enlarged sectional view of a typical air vent, as seen on line 7—7 of FIG. 6.

Generator 30 is axially located within waterwheel 6, preferably adjacent one end thereof and rotor 34 thereof is driven at higher speeds by speed-increaser unit or system 20. The preferred arrangement of speed-increasing system 20 is a planetary or epicyclic gear train with support member 22, see FIG. 4, for the planetary gears 23. The gears 23 being attached to intermediate rings or discs 14 by split adapter rings 14a, such that planetary gears 23 are rotated within internal ring gear 24 rigidly attached to housing 31 which also encloses the generator stator 32 and is prevented from rotating by flanged plate 36 and trunnion 16 which are bolted together. Trunnion 16 is suitably connected to generator 30 and support bracket 18 by bolts. The relatively high speed pinion gear 21, see FIG. 3, is connected to rotor shaft 35 which is suitably keyed by key 26 to rotor 34 of generator 30. Rotor shaft 35 rotates within bearing 37. Waterwheel 6 is supported on trunnions 16 and 17, respectively shown in FIGS. 4 and 5, and rigidly-bolted to support brackets 18 and 19, best shown in FIG. 2. Trunnion 17 has a single flange for bolting it to support bracket 19, as shown in FIG. 5, and extends into the bearing sleeve 17a of split cover plate 15 which is identical with a similar cover plate at the other end of waterwheel 6.

Generator 30 is conventional and thus is constructed of a magnetic rotor and wound coil stator wherein a changing magnetic flux induces an electromotive force or voltage therein. Trunnion 16 has dual flanges and is hollow, as illustrated in FIG. 4, so that electrical leads 38 may be brought out from stator 32 of generator 30. Support brackets 18 and 19 extend below platform 40 to which they are affixed and said platform spans spillway 42 above dam 44 bounded by end walls 41 and 46, as shown in FIG. 2, and extends to adjustable heavy-duty supports 50, which are located under each corner of platform 40. Adjustable supports 50 preferably are interconnected short stroke hydraulic pistons which can uniformly raise or lower platform 40 and waterwheel 6 so that the waterwheel preferably is not submerged into tailwater II, as shown in FIGS. 1 and 2, which can vary in elevation with flow changes.

Water that flows over dam 44 is directed onto waterwheel 6 by chute 60, which is attached and sealed to the crest of dam 44 by anchor plate 61 and anchor bolts 62 extending into the dam. Chute 60 is connected to anchor plate 61 by a hinge 64 extending the full width of spillway 42. Chute 60 is supported adjacent its downstream edge by adjustable positioning members 66 that extend below platform 40 to near the downstream edge of chute 60 which may be raised or lowered by any suitable raising and lowering means 66 to vary the water flow onto waterwheel 6. Chute 60 also is provided at opposite side edges with vertical end plates 68, see FIG. 1, which seal against vertical sidewalls 41 and 46, that extend beyond the length of chute 60 to contain the water flowing onto waterwheel 6. The downstream end of chute 60 preferably is reduced in width to match the length of waterwheel 6. Any suitable source 70 of operating fluid for actuating the adjustable supports 50 may be provided adjacent to, or on, platform 40. Pump, pipe and valve means generally designated 72, 73 and 74, respectively, are provided to pressurize and direct the flow of the pressurized fluid to the adjustable hydraulic positioning supports 50 and 66, respectively shown in FIGS. 1 and 2.

For construction purposes or maintenance, temporary flash boards 54 are typically provided. These boards are used to raise the dam level thus providing a dry area in which to work during installation. The boards 54 may be supported by pipes inserted into pipe sockets 55 which have been embedded into the dam.

Shroud 80, shown in FIG. 11A, consists of a curved plate 81 that extends the full length of waterwheel 6 and also vertically downward approximately 900 from about 30° above the horizontal centerline. The curvature has a radius slightly greater than that of waterwheel 6 to provide sufficient clearance to prevent rubbing when in operation. Shroud 80 is pivotably-attached to pivoted arms 82 and 84 which extend from pivot pins 85 and 83 at each end from upper and lower extremities of the shroud to pivot pins 86, located approximately midway on the downstream support brackets 18 and 19, adjacent opposite ends of waterwheel 6.

Shroud 80 is raised and moved away from waterwheel 6 by vertical hoists 88 located near each end of platform 40 directly above shroud 80. Hoists 88, in the preferred arrangement, are hydraulic cylinders supplied with operating pressure from source 70. However, other operating means may be used, such as motorized or manual screw jacks, for example. For structural rigidity, shroud 80 may be reinforced by ribs 87 located on the exterior thereof. Pivoted arms 82 and 84 may be structural shapes or flat plates, to minimize debris entanglement. For some applications, roller guide wheels may be needed at each end of shroud 80 to bear on circular plates or end rings 12 and 13 to prevent axial movement of shroud 80.

Figure 6:
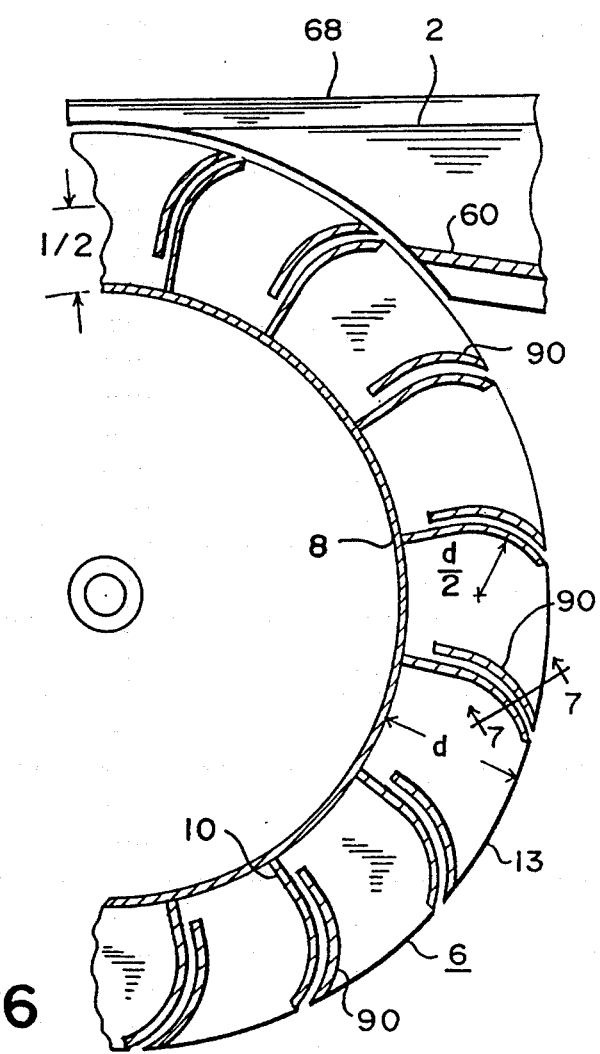
FIG. 6 is an enlarged fragmentary sectional view showing details of the bucket members and vents on the waterwheel.

As shown in fragmentary FIG. 6, there is attached rigidly to each bucket 10 of waterwheel 6 curved air vent pipes or angles 90. Each angle member 90 is curved correspondingly to the surface of the bucket to which it is welded at the edge of one flange and to the convex side of each bucket 10 and also at each side of the circular plates or planar rings 14 and the inside of end plates 12 and 13. Each vent angle 90 is bent in one plane to fit buckets 10 and extends to the outer diameter of waterwheel 6 and is open at the opposite ends thereof, allowing for air to travel in or out of both ends.

BASIS OF DESIGN

Normal bucket depth (d) is typically $0.16 \sqrt[3]{Head}$ to $0.25 \sqrt[3]{Head}$ for wide wheels or for a 6.56 ft (2 meter) head, 3.6 inches to 5.6 inches, see 1941 edition of Marks Handbook at page 1341, while at least $0.5 \sqrt[3]{Head}$ inches provides greater energy under variable flows. Typical overshot waterwheel diameters D from Marks Handbook are from 1.33 feet to 2.25 feet less than the Head which would provide a wheel diameter D of approximately 4 to 5 ¼ feet for a 2 meter head. Greater energy is provided by a wheel diameter D equal to approximately 90% of the $\sqrt[3]{Head}$ to allow for clearance underneath a chute with the chute's lowest position tangent to the radial mid-point of the bucket. This permits recovery of velocity head and maximum bucket filling under variable flow conditions. In Contrast, typical fixed chutes are located above the waterwheel diameter which may maximize efficiency for a given discharge but higher flows will tend to overshoot the buckets.

A larger wheel diameter results in a greater than optimum number of buckets following the typical formula of the well-known Marks Handbook of II D/d with d being equal to the radial depth of the buckets, as shown in FIG. 3. When diameter D is measured to the centerline of the bucket and is, for example, 5.0 feet, the calculated number of buckets is 17 and 16 would be practical to use. The diameter D should also be used with a circumferential velocity of 5 to 7 feet per second for a calculated speed of 23 RPM. The above numbers are representative only and are not intended to provide precise design criteria.

ALTERNATE DESIGN FEATURES

The shroud may be designed to enclose the outer edges of each bucket through the lower range of travel on the downstream side of the waterwheel to prevent premature emptying of each bucket before the bucket reaches the lowest point of travel. The shroud would extend the full width of the wheel and be supported at intervals from the platform The shroud would be designed to be raised to dislodge any debris caught on its leading edge.

Maximum energy recovery is also dependent on optimum bucket filling and rapid emptying. Air vents located in the back corners of each bucket, consisting of pipes or angle bars bent in one plane to fit the convex shape of the buckets and extending from the periphery of the bucket by ¼ to ¾ d will both discharge trapped air while buckets are filled and also admit air while they are emptying without the use of movable components. The location and shape thereof also make them readily attachable using automatic welding procedures.

The operation will now be described with reference to a standard analog clock face wherein 12 o'clock is opposite 6 o'clock and 3 o'clock is opposite the 9 o'clock. The water flow as shown in FIG. 1 is from right to left and thus the movement of the waterwheel 6 will be counterclockwise.

The water will flow above the dam crest along chute 60 spilling into buckets 10 somewhere between 1 and 2 o'clock. As each bucket is filled, the air contained therein will need to be displaced vents 90 aid in this displacement as they provide an escape for any air trapped beneath the filling water as the buckets rotate. Due to the bucket configuration most air will simply be displaced out the open end of the bucket as the water enters, however, since the bucket is moving angularly during filling some air may become trapped under a blanket of water. The location of vents 90 allow for any trapped air to escape. These vents are open on both ends and thus merely provide a conduit for escaping air.

The force of the water flow as well as the weight of the filled buckets once they pass 12 o'clock will continue to move the wheel in a counterclockwise fashion.

As the buckets approach 10 o'clock, shroud 80 will optionally come into operation Shroud 80 mates with, but is spaced from, the periphery of the buckets. The function of shroud 80 is to maintain as much water as possible in buckets 10 as the buckets rotate downward between the 9 through 7 o'clock positions. By maintaining the water, the weight on the downward rotation will be significantly greater than on the upward rotation between 6 and 1 o'clock positions. As previously described, the shroud 80 may be raised by hoist 88 in order to clear any debris collected thereon. On the downward cycle the vents 90 again come into play. In order for the water to leave the buckets, air must take its place. Therefore, vents 90 are designed to allow air into the bucket containing water to create smooth dumping. The vents function in much the same fashion as putting two opposed openings on a can top with a can opener in order to allow for smooth pouring.

Once the bucket reaches the 6 o'clock position and is empty, it begins the upward cycle and is filled again between the 2 through 12 o'clock positions.

This continuous counterclockwise motion causes rotor 34 to rotate via various gearing assemblies which in turn generates electrical energy to be generated and stored.

The foregoing description illustrates preferred embodiments of the invention. However, concepts employed may, based upon such description be employed in other embodiments without departing from the scope of the invention. Accordingly, the following claims are intended to protect the invention broadly, as well as in the specific forms shown herein.

We claim:

1. An electric power-generating mechanism adapted to be mounted across a waterway adjacent a dam therein and comprising in combination, a vertically adjustable support means including a platform sized to extend across said waterway adjacent the downstream side of the dam, and support members depending from said platform in spaced-relationship in order to suspend a waterwheel unit, said waterwheel unit including a waterwheel wherein the length of said water wheel is substantially greater than the diameter thereof, and said waterwheel being composed of an impervious cylinder and circular end plates respectively fixed to the opposite ends of said cylinder in order to form a watertight enclosure, a plurality of buckets spaced evenly around the circumference of said cylinder and fixed at one edge thereto, an electric generator unit mounted axially within said cylinder and comprising a rotor disposed axially within a stator and drive means operably connecting said waterwheel to said rotor, and securing means fixing said stator to said support means to prevent rotation thereof, an elongated chute adapted to be affixed at the upstream edge thereof to said dam adjacent the dam crest and the opposite downstream edge of said chute clearing the circular path defined by the outer edges of said buckets when said waterwheel is rotating and being supported by an adjustable chute support means extending from said support means and connected to said chute in spaced relation to the upstream edge of said chute and operable to vary the relation of the downstream edge of said chute relative to said circular path of the outer edges of said buckets in a manner to maximize the energy of the water delivered to said waterwheel to generate electric power.

2. The mechanism according to claim 1 in which said drive means includes a speed increaser which is connected between said rotor and waterwheel and is adapted to increase the rotational speed of said rotor relative to the rotational speed of said waterwheel.

3. The mechanism according to claim 2 in which said securing means for said stator of said generator unit includes a fixed trunnion attached to one of said depending support members on said platform while said rotor of said generator is rotated at increased rotational speed and is coaxial with and internal relative to said stator.

4. The mechanism according to claim 3 in which said speed increaser includes a planetary gear system.

5. The mechanism according to claim 1 in which said platform is vertically-adjustable relative to said dam by means of jack mechanism respectively located at opposite ends of said platform.

6. The mechanism according to claim 1 wherein the elongated chute includes a hinge approximate the upstream side thereof.

7. The mechanism according to claim 1 wherein the buckets are radial to said cylinder and the outer portion of each of said buckets is curved in a direction opposite to the rotation of said waterwheel.

8. The mechanism according to claim 7 wherein each bucket includes a venting means.

9. The mechanism according to claim 1 further including a shroud disposed circumferentially and concentrically relative to said waterwheel and pivotally-supported by means connected to said depending support members for said waterwheel and movable between positions adjacent the periphery of said waterwheel and a position radially-spaced from said waterwheel by a mechanical adjustment mechanism supported by said platform.

* * * * *